(12) United States Patent
Ramaraju et al.

(10) Patent No.: US 8,566,836 B2
(45) Date of Patent: Oct. 22, 2013

(54) MULTI-CORE SYSTEM ON CHIP

(75) Inventors: Ravindraraj Ramaraju, Round Rock, TX (US); David R. Bearden, Austin, TX (US); William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 698 days.

(21) Appl. No.: 12/618,311

(22) Filed: Nov. 13, 2009

(65) Prior Publication Data

US 2011/0119672 A1    May 19, 2011

(51) Int. Cl.
*G06F 9/46*   (2006.01)
*G06F 7/38*   (2006.01)

(52) U.S. Cl.
USPC ............ 718/104; 718/100; 718/102; 712/225

(58) Field of Classification Search
None
See application file for complete search history.

(56) References Cited

U.S. PATENT DOCUMENTS

| | | | |
|---|---|---|---|
| 7,315,484 B2 | 1/2008 | Yang et al. | |
| 7,512,723 B2 | 3/2009 | Tkacik et al. | |
| 2008/0082844 A1 * | 4/2008 | Ghiasi et al. | 713/323 |
| 2008/0104561 A1 | 5/2008 | Carpenter et al. | |
| 2008/0189569 A1 * | 8/2008 | Chu | 713/600 |
| 2008/0222361 A1 | 9/2008 | Ramaraju et al. | |
| 2008/0256339 A1 | 10/2008 | Xu et al. | |
| 2009/0055826 A1 * | 2/2009 | Bernstein et al. | 718/102 |
| 2009/0070552 A1 | 3/2009 | Kanstein et al. | |
| 2010/0075622 A1 * | 3/2010 | Wang et al. | 455/141 |
| 2010/0199280 A1 * | 8/2010 | Vestal et al. | 718/102 |
| 2011/0107344 A1 * | 5/2011 | Kim et al. | 718/105 |

OTHER PUBLICATIONS

Intel Core i7 Processor Extreme Edition and Intel Core i7 Processor, Datasheet, vol. 1, pp. 1, 13-15, 22, 24, 25, Nov. 2008.
S. Borkar, Thousand Core Chips—A Technology Perspective, Proceedings of the 44th Annual Design Automation Conference, San Diego, California, pp. 746-749, Year of Publication: 2007.

* cited by examiner

*Primary Examiner* — Kenneth Tang
(74) *Attorney, Agent, or Firm* — Terrile, Cannatti, Chambers & Holland, LLP; Michael Rocco Cannatti (57) ABSTRACT

A multi-core system on a chip (200) is described in which a speed information for each core (210, 220, 230, 240), such as the maximum operation speed (Fmax), is extracted and stored in a storage device, such as a device control registry (215), where it may be accessed and used by the operating system when allocating workload among the cores by selecting the fasted core (e.g, 210) to run any applications or tasks that can not be executed on a plurality of cores.

22 Claims, 4 Drawing Sheets

MULTI-CORE SYSTEM ON CHIP

BACKGROUND OF THE INVENTION

1. Field of the Invention

The present invention is directed in general to the field of processor or computer design and operation. In one aspect, the present invention relates to the operation of a multi-core processor.

2. Description of the Related Art

A multi-core processor is a processing system having two or more independent cores integrated onto a single integrated circuit die (known as a chip multiprocessor or CMP) or onto multiple dies in a single chip package. For example, a dual-core processor contains two cores, a quad-core processor contains four cores, and so on. The cores in a multi-core processor may or may not be identical in terms of design, operation or architecture, but even with homogeneous multi-core systems where the cores are identical, there will be differences in operating frequency for the different cores.

Accordingly, a need exists for an improved multi-core processor, system and method of operation that addresses various problems in the art that have been discovered by the above-named inventors where various limitations and disadvantages of conventional solutions and technologies will become apparent to one of skill in the art after reviewing the remainder of the present application with reference to the drawings and detailed description which follow, though it should be understood that this description of the related art section is not intended to serve as an admission that the described subject matter is prior art.

BRIEF DESCRIPTION OF THE DRAWINGS

The present invention may be understood, and its numerous objects, features and advantages obtained, when the following detailed description is considered in conjunction with the following drawings, in which.

DETAILED DESCRIPTION

A multi-core system on chip and associated method of operation are described for executing single core jobs or applications on the multi-core SoC by using the actual maximum operating frequencies for the individual cores on the SoC to select which core will execute the single core job/application. In an example implementation, each core includes a critical path monitoring circuit which is used to measure or estimate the maximum operating frequency (Fmax) at a given voltage (e.g., the nominal operating voltage). Each core may then be tagged with its maximum operating frequency (Fmax) and a corresponding operating voltage (Vop) by storing the measured Fmax value or the Fmax, Vop value pair (e.g., in a device control register). In this way, when the operating system is distributing the work load, the OS can send each single core job/application to the fastest available core by reading the stored Fmax values—or (Fmax, Vop) value pairs—for the cores to identify the fastest core. By tagging each core with its Fmax at a given voltage, the OS has the flexibility and option to run a job that cannot be run across multiple cores by running it in the fastest core, thereby improving the device performance of the multi-core SoC without substantially increasing the power. In this way, jobs that cannot be distributed across multiple cores can now be executed on a single core which can run at a higher frequency than the nominal frequency at the nominal voltage.

Various illustrative embodiments of the present invention will now be described in detail with reference to the accompanying figures which illustrate functional and/or logical block components and various processing steps. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected embodiments of the present invention are implemented, for the most part, with electronic components and circuits known to those skilled in the art, and as a result, circuit details have not been explained in any greater extent since such details are well known and not considered necessary to teach one skilled in the art of how to make or use the present invention. In addition, selected aspects are depicted with reference to simplified circuit schematics, logic diagrams, and flow chart drawings without including every circuit detail or feature in order to avoid limiting or obscuring the present invention. Such descriptions and representations are used by those skilled in the art to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that, throughout the description, discussions using terms such as "processing" or "computing" or "calculating" or "determining" or "displaying" or the like, refer to the action and processes of a core, a computer system, similar electronic computing device, or other types of electronic circuitry that manipulates and transforms data represented as physical (electronic) quantities within the computer system's registers and memories into other data similarly represented as physical quantities within the computer system memories or registers or other such information storage, transmission or display devices.

Figure 1:
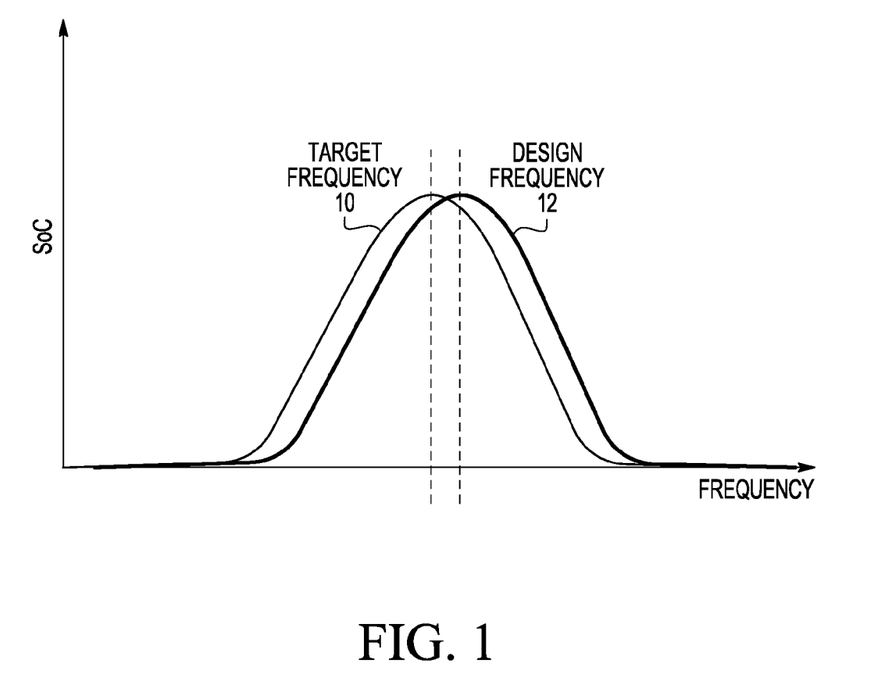
FIG. 1 is a chart showing the target and design frequency distributions for multi-core SoCs.

As indicated above, the cores in a multi-core processor can often have different operating frequencies or other performance measures. These differences are caused by variations in the electrical and physical characteristics of the transistors used to form the individual cores, as well as other factors relating to the location of each core, its power supply grid, heat dissipation performance, etc. This is illustrated in FIG. 1's chart of the target frequency distribution 10 for multi-core SoCs in which there is a Gaussian distribution of the maximum operating frequency of the cores for a given operating voltage, where some cores are faster than the median target frequency, and some cores are slower than the median target frequency. To account for such differences, each core is typically designed to have a "design frequency" that is higher than the "target frequency" for the overall multi-core processor, thereby providing a performance cushion against the different operating frequencies of the individual cores. However, as shown in FIG. 1's chart of the target and design frequency distributions 10, 12 for multi-core SoCs, there is still a Gaussian distribution of frequencies, meaning that there will always be differences between the maximum operating frequencies of the cores on a given multi-core system on chip (SoC). As a result, when characterizing or rating the performance of a given multi-core system on chip (SoC), the core having the slowest frequency of all the cores is taken as the operating frequency for the SoC so that a multi-core application or task can be performed by all cores, even if some are operating below their maximum operating frequency.

Figure 2:
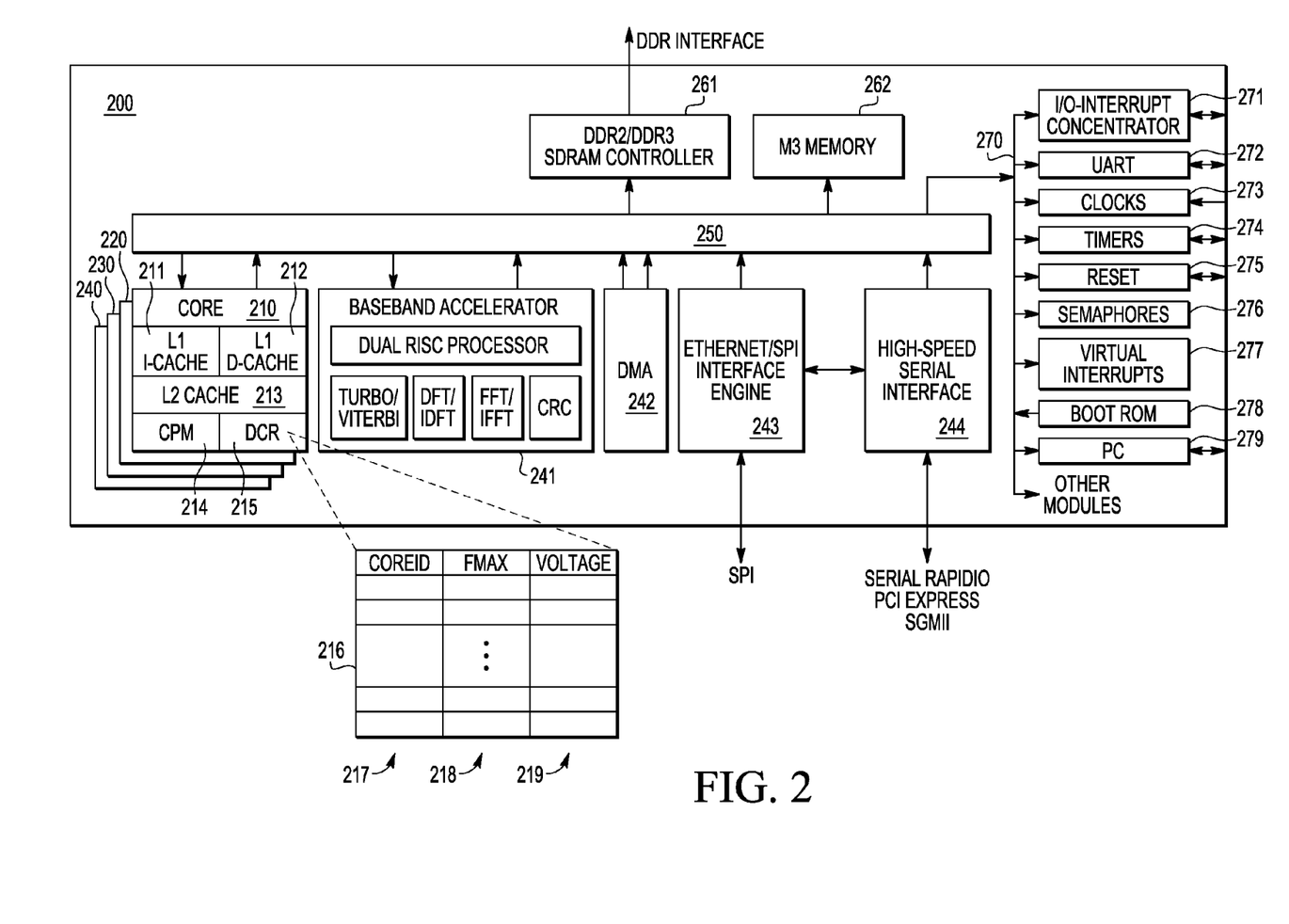
FIG. 2 illustrates a simplified schematic diagram of a processor chip having multiple processor cores, wherein each core contains a critical path monitoring circuit for measuring the maximum operating frequency in accordance with selected embodiments of the invention.

Referring now to FIG. 2, there is shown a simplified schematic diagram of a multi-core system on chip 200 having multiple processor cores 210, 220, 230, 240, wherein each processing core (e.g., 210) contains a critical path monitoring (CPM) circuit (e.g., 214) for measuring the maximum operating frequency in accordance with selected embodiments of the invention. As illustrated, each of the processor cores 210, 220, 230, 240 is coupled to one or more levels of cache memory, such as an L1 instruction cache 211, L1 data cache 212, and/or L2 cache 213. While the processor cores 210, 220, 230, 240 may be identically designed or homogenous, the multi-core SoC may also include one or more cores having a different design. For example, the depicted multi-core SoC 200 also includes a baseband accelerator 241 which includes one or more RISC processor cores for supporting hardware acceleration for Turbo and Viterbi channel decoding, for DFT/iDFT and FFT/iFFT algorithms, and for CRC processing. Though not shown, each core on the baseband accelerator 241 may have its own dedicated CPM circuit. Each processor core is coupled across an interconnect bus 250 to one or more memory controllers 261, which are coupled in turn to one or more banks of system memory (not shown). The interconnect bus 250 also couples the processor cores to a Direct Memory Access (DMA) controller 242, network interface 243, a high speed serial interface 244, and to other hardware devices 271-279.

Each of the processor cores 210, 220, 230, 240 may be configured to execute instructions and to process data according to a particular instruction set architecture (ISA), such as x86, PowerPC, SPARC, MIPS, and ARM, for example. In a selected embodiment, a highly suitable example of a processor design for the processor core is a StarCore SC3850 processor core that runs at 1 GHz. Those of ordinary skill in the art also understand the present invention is not limited to any particular manufacturer's microprocessor design. The processor core may be found in many forms including, for example, any 32-bit or 64-bit microprocessor manufactured by Freescale, Motorola, Intel, AMD, Sun or IBM. However, any other suitable single or multiple microprocessors, microcontrollers, or microcomputers may be utilized. In the illustrated embodiment, each of the processor cores 210, 220, 230, 240 may be configured to operate independently of the others, such that all cores may execute in parallel. In some embodiments, each of cores may be configured to execute multiple threads concurrently, where a given thread may include a set of instructions that may execute independently of instructions from another thread. Such a core may also be referred to as a multithreaded (MT) core. Thus, a single multi-core SoC 200 with four cores will be capable of executing a multiple of four threads in this configuration. However, it should be appreciated that the invention is not limited to four processor cores and that more or fewer cores can be included. In addition, the term "core" refers to any combination of hardware, software, and firmware typically configured to provide a processing functionality with respect to information obtained from or provided to associated circuitry and/or modules (e.g., one or more peripherals, as described below). Such cores include, for example, digital signal processors (DSPs), central processing units (CPUs), microprocessors, and the like. These cores are often also referred to as masters, in that they often act as a bus master with respect to any associated peripherals. Furthermore, the term multi-core (or multi-master) refers to any combination of hardware, software, and firmware that that includes two or more such cores (e.g., cores 210 and 220), regardless of whether the individual cores are fabricated monolithically (i.e., on the same chip) or separately. Thus, a second core may be the same physical core as first core, but has multiple modes of operation (i.e., a core may be virtualized).

As depicted, each processor core (e.g., 210) may include a first level (L1) cache which includes a data cache (dcache) 211 and an instruction cache (icache) 212. In addition, a second level of cache memory (L2) 213 may also be provided at each core, though the L2 cache memory can also be an external L2 cache memory which is shared by one or more processor cores. The processor core 210 executes instructions and processes data under control of the operating system (OS) which may designate or select the processor core 210 as the control or master node for controlling the workload distribution amongst the processor cores 210, 220, 230, 240. Communication between the cores 210, 220, 230, 240 may be over the interconnect bus 250 or over a crossbar switch and appropriate dual point to point links according to, for example, a split-transaction bus protocol such as the HyperTransport (HT) protocol (not shown).

The processor cores 210, 220, 230, 240 and baseband accelerator 241 are in communication with the interconnect bus 250 which manages data flow between the cores and the memory. The interconnect bus 250 may be configured to concurrently accommodate a large number of independent accesses that are processed on each clock cycle, and enables communication data requests from the processor cores 210, 220, 230, 240 to external system memory and/or M3 memory 262, as well as data responses therefrom. In selected embodiments, the interconnect bus 250 may include logic (such as multiplexers or a switch fabric, for example) that allows any core to access any bank of memory, and that conversely allows data to be returned from any memory bank to any core. The interconnect bus 250 may also include logic to queue data requests and/or responses, such that requests and responses may not block other activity while waiting for service. Additionally, the interconnect bus 250 may be configured as a chip-level arbitration and switching system (CLASS) to arbitrate conflicts that may occur when multiple cores attempt to access a memory or vice versa.

The interconnect bus 250 is in communication with main memory controller 261 to provide access to the M3 memory 262 or main memory (not shown). Memory controller 261 may be configured to manage the transfer of data between the multi-core SoC 200 and system memory, for example. In some embodiments, multiple instances of memory controller 261 may be implemented, with each instance configured to control a respective bank of system memory. Memory controller 261 may be configured to interface to any suitable type of system memory, such as Double Data Rate or Double Data Rate 2 or Double Data Rate 3 Synchronous Dynamic Random Access Memory (DDR/DDR2/DDR3 SDRAM), or Rambus DRAM (RDRAM), for example. In some embodiments, memory controller 261 may be configured to support interfacing to multiple different types of system memory. In addition, the Direct Memory Access (DMA) controller 242 may be provided which controls the direct data transfers to and from system memory via memory controller 261.

As will be appreciated, the multi-core SoC 200 may be configured to receive data from sources other than system memory. To this end, a network interface engine 243 may be configured to provide a central interface for handling Ethernet and SPI interfaces, thus off-loading the tasks from the cores. In addition, a high speed serial interface 244 may be configured to support one or more serial RapidIO ports, a PCI-Express Controller, and/or a serial Gigabit Media Independent Interface (SGMII). In addition, one or more interfaces 270 may be provided which are configured to couple the cores to external boot and/or service devices, such as I/O interrupt concentrators 271, UART device(s) 272, clock(s) 273, timer(s) 274, reset 275, hardware semaphore(s) 276, virtual interrupt(s) 277, Boot ROM 278, I2C interface 279, GPIO ports, and/or other modules.

By providing each processor core 210, 220, 230, 240 with a dedicated CPM circuit, the operation or reliability of the cores can be separately and concurrently monitored under differing circuit conditions (such as temperature, frequency, and voltage, including localized noise and droop). In addition, the CPM circuit can measure one or more core performance parameters (e.g., maximum operating frequency). In selected embodiments, the CPM circuit at each core measures the core operation parameter (e.g., Fmax) at a plurality of operating voltages to define the core operation parameter at each operating voltage state. This would allow, for example, a first core operation parameter value to be measured at a first regular power supply voltage level and a second core operation parameter value to be measured at a second lower power supply voltage level. While any desired circuit arrangement may be used to monitor the critical path or device performance of each core, in an example implementation, the CPM circuit 214 may be implemented with a ring oscillator circuit that is followed by one or more logic gate structures having predetermined logic stages/gates (e.g., a flip-flop data path).

As disclosed herein, the measured performance parameters may be stored in a device control registry for use in allocating core resources. In selected embodiments, a device control registry may be located at each core, but in other embodiments, a designated central or master core (e.g., core 220) includes a shared device control registry (DCR) 215 which is used to tag each core with its corresponding maximum operating frequency at a given voltage. An example tagging data structure 216 is shown in FIG. 2 as listing an identifier for each core (Coreid) 217, the corresponding measured maximum operating frequency (Fmax) 218, and the specified operating voltage (Voltage) 219 at which the measurement was taken. Again, the tagging data structure 216 may store, for each core, a plurality of maximum operating frequency values 218 that are measured at a corresponding plurality of operating voltages 219. In selected embodiments, the tagging data structure 216 can be dynamically updated and modified on the fly (e.g., by periodically measuring the processing speed parameter) so that current performance parameter measurements are kept. Additional information may also be stored in the tagging data structure 216, such as a status indication if the core is available for use, as well as other performance parameter information at different operating voltages.

Using the information in the DCR 215/tagging data structure 216, the operating system can run a job that cannot be distributed across multiple cores by first reading the DCR 215 to identify the core having the fastest Fmax value, and then sending the job to the core tagged with the highest operating frequency, thereby enabling the identified core to operate at its maximum operating frequency for the same nominal voltage. This approach allows single core applications to have improved performance by running on the SoC's fastest available core. The improved performance may be obtained without significantly increasing the power consumption. This results from the fact that static power leakage is the same across all cores, regardless of operating frequency, and can be the dominant component of power consumption as compared to the dynamic power. As a result, the operation of the fastest core changes only the dynamic power, not the static power, so there is no substantial power increase by running the single core application through the fastest core.

In embodiments where a single shared power supply voltage source is provided to the processor cores 210, 220, 230, 240, the clocks at each core may be separately controlled by providing each core with its own clock generating module. To this end, each core may include a core-specific clock module, such as a phase lock loop (PLL) circuit or other clock generation mechanism (not shown), which modifies the frequency of a received shared reference clock source signal by applying a clock multiplier value. For example, the clock multiplier value may be stored in the tagging data structure 216 with the corresponding Fmax, Vop value pair for the core. In this way, once the fastest available core is selected for executing a single-core application, the clock rate for that core can be raised or lowered to a desired clock rate by applying the clock multiplier value while other cores stay at a fixed clock rate for a given target supply voltage or performance class.

Figure 3:
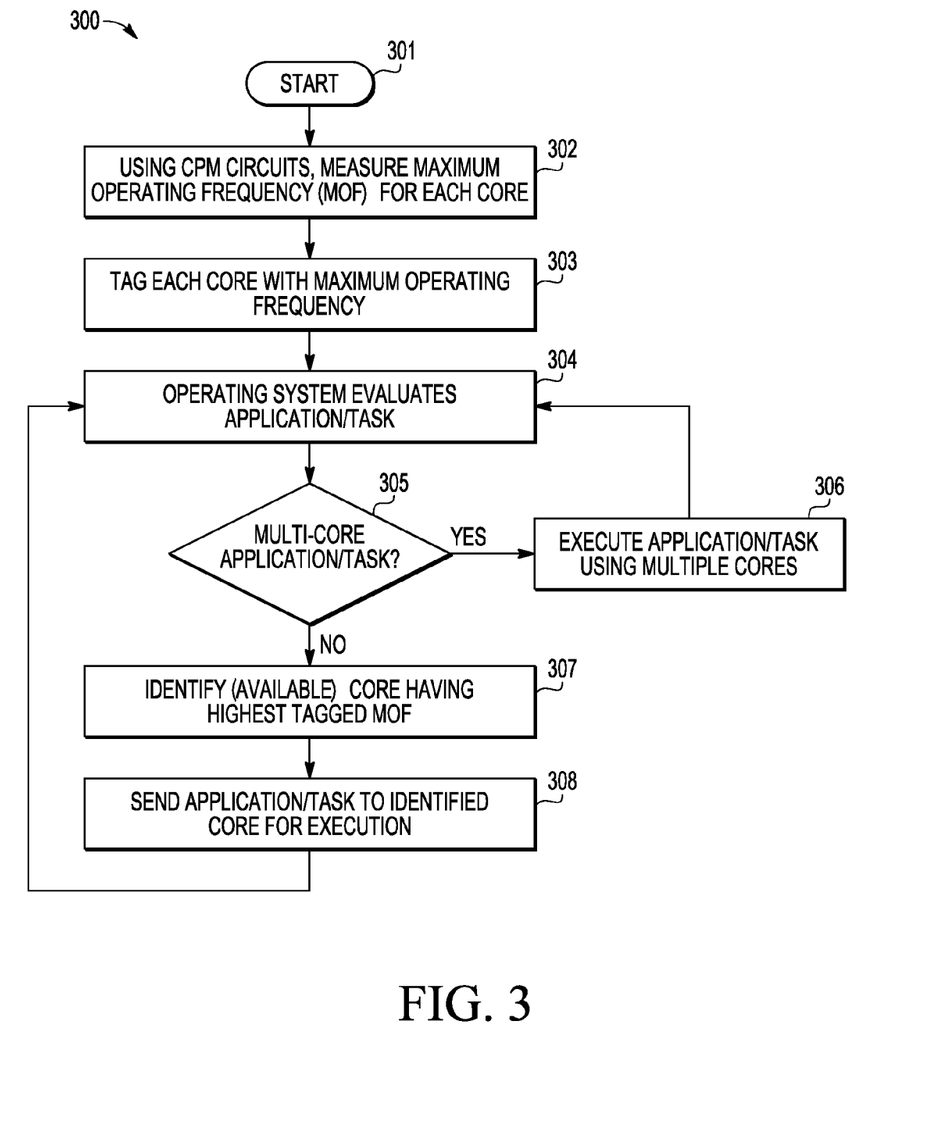
FIG. 3 illustrates a flow diagram for the operation of a multi-core processor system which performs jobs that can not be distributed across multiple cores by sending the job to the core having the highest operating frequency.

FIG. 3 illustrates a flow diagram 300 for the operation of a multi-core processor system which performs jobs that can not be distributed across multiple cores by sending the job to the core having the highest operating frequency. Once the sequence begins at step 301, the critical path monitoring (CPM) circuit is used to measure each core to determine or estimate the maximum operating frequency (MOF) at a given voltage (step 302). In selected embodiments, the measurement step 302 may be repeated to obtain MOF values for different operating voltage or performance classes so that a low voltage MOF and high voltage MOF are obtained. Additional or other performance parameters can be measured by the CPM circuit to assist with evaluating and selecting a core for running an application, task, or job. At step 303, each core is tagged with its maximum operating frequency (MOF) value. The tagging may be accomplished by storing the MOF value in one or more device control registers that can be read by the operating system when deciding how to distribute the work load.

Subsequently at step 304, the operating system assesses a particular application or task to determine how the multi-core SoC should execute the application/task. At step 305, the operating system determines if the application or task at hand can be executed on a plurality of cores. If so (affirmative outcome to decision 305), the operating system assigns the application/task to the appropriate cores for execution (step 306), after which the sequence returns to evaluate the next application/task (step 304). However, if the application/task can not make use of multiple cores (negative outcome to decision 305), the operating system identifies core having the highest MOF value at step 307. This may be accomplished by accessing the device control registry(s) to determine which core identifier has the highest MOF value and is available for use (though the availability determination may be made separately). At step 308, the operating system assigns the application/task to the identified core having the fastest speed for execution, after which the sequence returns to evaluate the next application/task (step 304).

As described here, the tracking of performance parameters (such as maximum operating frequency) for each core to choose high-performance cores for single-core applications or tasks can advantageously be applied with multi-core SoCs where the cores all share a common external supply voltage that has one or more voltage levels. In particular, when all cores are connected to a single power supply, multi-core applications are divided among the cores by the operating system or controller, and run at a single common frequency for a given target supply voltage or performance class (namely, the operating frequency of the slowest core in the plurality of cores). But for single-core applications/tasks, the operating system or controller chooses the core having the fastest (available) operating frequency using the information collected and stored in the device control registry(s) for a given target supply voltage or performance class.

Figure 4:
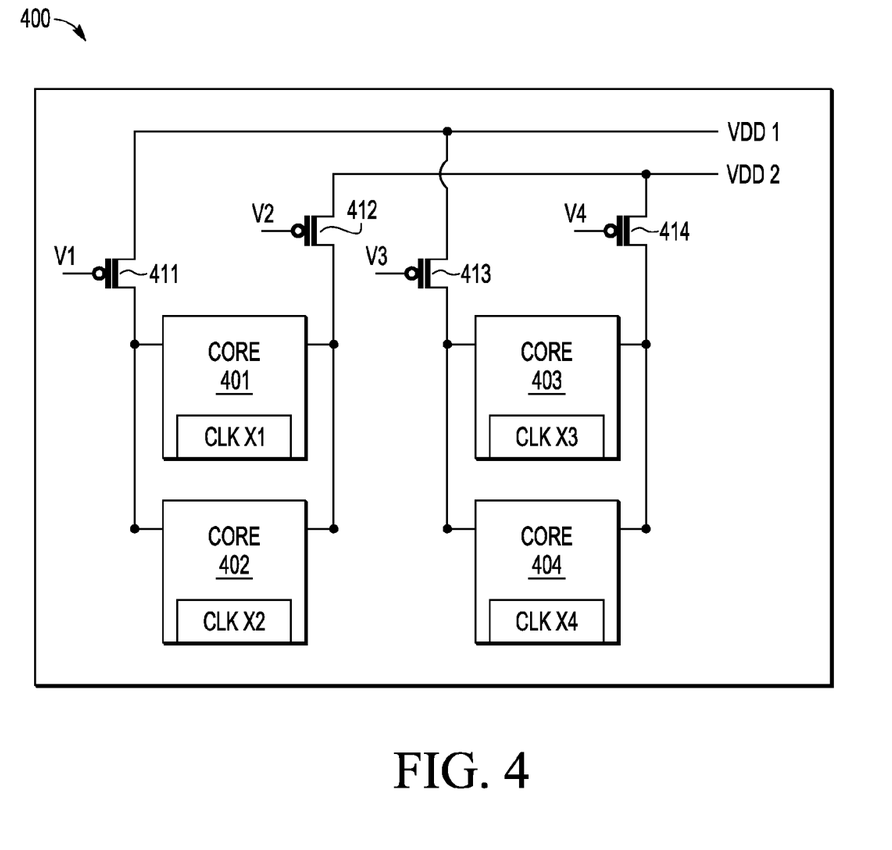
FIG. 4 illustrates a simplified block diagram of a multi-core SOC in which two or more power supply voltages may be supplied to cores on the multi-core SOC.

As will be appreciated, performance parameters can also be tracked and advantageously applied with multi-core SoCs where there are separate voltage distribution mechanisms so that one group of cores share a first external supply voltage and a second group of cores share a second external supply voltage. FIG. 4 illustrates such a system with the simplified block diagram of a multi-core SOC 400 in which two or more power supply voltages Vdd1, Vdd2 are be supplied to the cores 401-404 under control of the power supply selection signals V1-V4 applied to PFET connection switches 411-414, though it will be appreciated that the techniques can be extended to cover more or fewer cores. As illustrated, a first core 401 which receives a first power supply voltage Vdd1 under control of the first power supply selection signal V1 and switch 411 can operate at a first frequency (e.g., f). Alternatively, the first core 401 which receives a second, lower power supply voltage Vdd2=0.7 Vdd1 under control of the second power supply selection signal V2 and switch 412 operates at a second lower frequency (e.g., f/2). Of course, if the second power supply voltage Vdd2 is higher than the first power supply voltage Vdd1, then the first core 401 operates at a faster speed than it would if supplied with the first power supply voltage. In similar fashion, one or more additional cores 402 may be connected in the same way to the power supply voltages Vdd1, Vdd2 under control of the power supply selection signals V1, V2 and switches 411, 412. In addition, other core groups (e.g., 403, 404) may be connected to power supply voltages via separate power supply selection signals V3, V4 and switches 413, 414. With separately selectable power supply voltages, the multi-core SOC 400 shown in FIG. 4 is able to support multiple decision levels and groupings of cores, thereby enabling the operating system or controller to use the tracked performance parameters (such as maximum operating frequency) for each core in the shared device control registry to efficiently and flexibly allocate core resources.

For example, when all cores 401-404 are needed to execute a multi-core application, the operating system or controller runs the multi-core application at a single desired target operating frequency for a given target supply voltage or performance class—namely, the operating frequency of the slowest of the cores 401-404. In this multi-core application situation, the same power supply voltage level (e.g., Vdd1) may be supplied to all of the cores, along with individual clock multiplier values for each core, where each core (e.g., 401) may include a core-specific clock module Clk X1, such as a phase lock loop (PLL) circuit or other clock generation mechanism, which modifies the frequency of a shared reference clock source signal (not shown) by applying a clock multiplier value to obtain the desired target operating frequency. Of course, if the tracked performance parameter information indicates that the cores in a first group (e.g., 401, 402) can perform at the desired target operating frequency using the lower voltage Vdd2, then the power supply selection signals V1, V2 may be applied to supply the second power supply voltage Vdd2 to cores 401, 402, while the power supply selection signals V3, V4 may be applied to supply the first power supply voltage Vdd1 to cores 403, 404.

In similar fashion, when only some of the cores are needed to execute a multi-core application, such as a two-core application, the operating system or controller can use the tracked performance parameter information in the DCR to partition the cores 401-404 into separate partitions so that the fastest partition of cores is used to run the application. In this situation, the tracked performance parameter information may be used to identify cores 403 and 404 as having the fastest two operating frequencies of the cores for a given target supply voltage or performance class, and the operating system or controller uses the fastest cores 403-404 to run the two-core application at the operating frequency of the slowest of the cores 403-404 by supplying the first power supply voltage Vdd1 under control of the power supply selection signals V3, V4 to cores 403, 404. Again, clock multiplier values for each core 403, 404 may be obtained from the DCR and used at the core-specific clock modules Clk X3, Clk X4 to modify the frequency of a shared reference clock source signal to obtain the desired target operating frequency at the cores 403, 404.

Finally, if only a single core application is to be run, the operating system or controller uses the tracked performance parameter information from the DCR to identify which of the cores 401-404 is the fastest core, and then selects the fastest core to run the application by supplying the first power supply voltage Vdd1 to that core under control of the appropriate power supply selection signals.

These techniques may be applied to level or equalize the performance of the cores on a multi-core SOC by selectively applying power supply voltages based on the measured performance parameters for each core. For example, when running a multi-core application on the multi-core SOC 400, the operating system or controller can use the tracked performance parameter information in the DCR to lower the speed of the fastest core to match the other core speeds by supplying a power supply voltage to the fastest core that is lower than the power supply voltage that is supplied to the slower core(s). Conversely, the tracked performance parameter information can be used to increase the speed of the slowest core(s) to match the faster core speeds by supplying a power supply voltage to the slower core(s) that is higher than the power supply voltage that is supplied to the fastest cores. Thus, two or more power supply voltages can be selectively applied to the cores to achieve balanced or level operating speeds across the cores.

By now, it should be appreciated that there has been provided herein a method, apparatus, and system for operating a multi-core processing device that is constructed on a single integrated circuit system on a chip. As disclosed, a processing speed parameter (e.g., a maximum operating frequency parameter) is measured for each of a plurality of cores. The measurement may be done by employing a critical path monitoring circuit located at each core to measure a maximum operating frequency parameter for each of the plurality of cores. In addition, the processing speed parameter may be dynamically measured on a predetermined basis to provide real-time status information. In selected embodiments, multiple processing speed parameters for each core are measured, such as by measuring a first processing speed parameter at each core operating with a first operating supply voltage, and then measuring a second processing speed parameter at each core operating with a second operating supply voltage. Each measured processing speed parameter is then stored for each of the cores in a storage device, such as a device control register. In this way, each core is tagged with a corresponding measured maximum operating speed parameter. When the operating system identifies a processing task that can not be run by a plurality of cores, the OS selects a core having a fastest measured processing speed parameter to run the processing task.

In another form, there is provided a multi-core system on chip (SOC) and method for operating same. As disclosed, the multi-core SOC includes a plurality of cores, where each core includes a performance measurement circuit, such as a critical path monitoring circuit, for measuring a performance parameter value for said core. Each core may also include a core-specific clock circuit for applying a clock multiplier value to a received clock reference signal. The multi-core SOC also includes at least a first storage device for storing the performance parameter values for the plurality of cores for use in selecting a core having maximized or minimized performance parameter value to run a processing task that can not be run by the plurality of cores. For example, the first storage device can store a maximum operating frequency value for each of the plurality of cores for use in selecting a core having the fastest maximum operating frequency value to run the processing task that can not be run by the plurality of cores. The storage device may be a device control registry located at a first core which stores, for each core, a core identification value, a measured maximum operating frequency value, and a corresponding operating voltage value. In other embodiments, the storage device may be a stand alone device control registry located outside the cores in the SOC. In some embodiments, the plurality of cores all share a common external voltage supply, while in other embodiments, a plurality of external voltage supplies are provided to the plurality of cores. With this arrangement, control logic may be included in the multi-core SOC for selecting a sub-plurality of cores (namely, fewer than all of the plurality of cores) to run a processing task that can not be run by the plurality of cores by using the performance parameter values to identify the fastest sub-plurality of cores.

In yet another form, there is provided a multi-core processor having multiple cores which are controlled by system logic. In operation, the multi-core processor executes single core applications and multi-core applications by measuring a maximum processing speed value for each of the multiple cores for at least a first operating voltage value. Each measured maximum processing speed value for each of the multiple cores is stored in a device control registry along with a corresponding core identifier value. Each measured maximum processing speed value for each of the multiple cores may also be stored in the device control registry along with an operating voltage value at which the maximum processing speed value is measured. The system logic runs multi-core applications on the plurality of the multiple cores by controlling the plurality of the multiple cores to run at a speed which is identified from the stored maximum processing speed values to be the slowest maximum processing speed of the plurality of the multiple cores. The system logic also runs single core applications on a single core which is identified from the stored maximum processing speed values for the multiple cores as being the fastest core.

Although the described exemplary embodiments disclosed herein are directed to various embodiments, the present invention is not necessarily limited to the example embodiments which illustrate inventive aspects of the present invention that are applicable to a wide variety of multi-core process systems and operational methodologies. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. The term "coupled," as used herein, is not intended to be limited to a direct coupling or a mechanical coupling. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for operating a multi-core processing device, comprising:
    measuring a processing speed parameter for each of a plurality of cores;
    storing each measured processing speed parameter for each of the plurality of cores in a storage device; and
    upon identifying a processing task that can not be run across the plurality of cores, selecting a core from the plurality of cores having a fastest measured processing speed parameter at a given voltage to run the processing task.

2. The method of claim 1, where measuring the processing speed parameter comprises measuring a maximum operating frequency parameter for each of the plurality of cores.

3. The method of claim 1, where measuring a processing speed parameter comprises periodically measuring the processing speed parameter on a predetermined basis.

4. The method of claim 1, where measuring the processing speed parameter comprises measuring a maximum operating frequency parameter for each of the plurality of cores using a critical path monitoring circuit located at each core.

5. The method of claim 1, where storing each measured processing speed parameter comprises storing each measured processing speed parameter in a device control register.

6. The method of claim 1, where storing each measured processing speed parameter comprises tagging each core with a corresponding measured maximum operating speed parameter.

7. The method of claim 1, where an operating system selects the core having the fastest measured processing speed parameter to run the processing task.

8. The method of claim 1, where the multi-core processing device is constructed on a single integrated circuit system on a chip.

9. The method of claim 1, where measuring the processing speed parameter for each of the plurality of cores comprises:
   measuring a first processing speed parameter for each of the plurality of cores operating with a first operating supply voltage; and
   measuring a second processing speed parameter for each of the plurality of cores operating with a second operating supply voltage that is different from the first operating supply voltage.

10. A multi-core system on chip (SOC), comprising:
    a plurality of cores, each core comprising a performance measurement circuit for measuring a performance parameter value for said core; and
    at least a first storage device for storing the performance parameter values for the plurality of cores for use in selecting a core having maximized or minimized performance parameter value at a specified voltage to run a processing task that can not be run across the plurality of cores.

11. The multi-core SOC of claim 10, where the performance measurement circuit at each core comprises a critical path monitoring (CPM) circuit.

12. The multi-core SOC of claim 10, where the first storage device comprises a device control registry located at a first core.

13. The multi-core SOC of claim 10, where the first storage device comprises a device control registry which stores a core identification value and a measured maximum operating frequency value for each core.

14. The multi-core SOC of claim 10, where the first storage device comprises a device control registry which stores, for each core, a core identification value, a measured maximum operating frequency value and a corresponding operating voltage value.

15. The multi-core SOC of claim 10, where the plurality of cores all share a common external voltage supply.

16. The multi-core SOC of claim 10, where a plurality of external voltage supplies are provided to the plurality of cores.

17. The multi-core SOC of claim 10, where each of the plurality of cores comprises a core-specific clock circuit for applying a clock multiplier value to a received clock reference signal.

18. The multi-core SOC of claim 10, where the at least a first storage device stores a maximum operating frequency value for each of the plurality of cores for use in selecting a core having the fastest maximum operating frequency value to run the processing task that can not be run by the plurality of cores.

19. The multi-core SOC of claim 10, further comprising control logic for selecting a sub-plurality of cores to run a processing task that can not be run by the plurality of cores by using the performance parameter values to identify the fastest sub-plurality of cores.

20. In a multi-core processor comprising multiple cores which are controlled by system logic, a method for executing single core applications and multi-core applications comprising:
    measuring a maximum processing speed value for each of the multiple cores for at least a first operating voltage value;
    storing each measured maximum processing speed value for each of the multiple cores;
    running a multi-core application on a plurality of the multiple cores by controlling each of the plurality of the multiple cores to run at a speed which is identified from the stored maximum processing speed values to be the slowest maximum processing speed of the plurality of the multiple cores; and
    running a single core application on a single core which is identified from the stored maximum processing speed values for the multiple cores as being the fastest core upon identifying a processing task that cannot be run across the plurality of the multiple cores.

21. The method of claim 20, where storing each measured maximum processing speed value comprises storing each measured maximum processing speed value for each of the multiple cores in a device control registry along with an operating voltage value at which the maximum processing speed value is measured.

22. The method of claim 20, where storing each measured maximum processing speed value comprises storing each measured maximum processing speed value for each of the multiple cores in a device control registry along with an operating voltage value at which the maximum processing speed value is measured.

* * * * *